(12) United States Patent
Fu et al.

(10) Patent No.: US 12,458,224 B2
(45) Date of Patent: Nov. 4, 2025

(54) SYSTEM FOR STRABISMUS ASSESSMENT AND A METHOD OF STRABISMUS ASSESSMENT

(71) Applicant: The Education University of Hong Kong, Tai Po (HK)

(72) Inventors: Hong Fu, Tai Po (HK); Yanjie Song, Tai Po (HK); Yang Zheng, Tai Po (HK)

(73) Assignee: The Education University of Hong Kong, Tai Po (HK)

( * ) Notice: Subject to any disclaimer, the term of this patent is extended or adjusted under 35 U.S.C. 154(b) by 424 days.

(21) Appl. No.: 18/092,983

(22) Filed: Jan. 4, 2023

(65) Prior Publication Data

US 2024/0081641 A1 Mar. 14, 2024

(51) Int. Cl.
*A61B 3/113* (2006.01)
*A61B 3/14* (2006.01)
*A61B 3/00* (2006.01)

(52) U.S. Cl.
CPC ............... *A61B 3/113* (2013.01); *A61B 3/14* (2013.01); *A61B 3/0008* (2013.01)

(58) Field of Classification Search
CPC ......... A61B 3/113; A61B 3/14; A61B 3/0008; A61B 3/0025; A61B 3/085; G06T 7/0012; G06T 2207/30041
USPC ......................................................... 351/206
See application file for complete search history.

(56) References Cited

U.S. PATENT DOCUMENTS

| | | | |
|---|---|---|---|
| 10,742,944 B1* | 8/2020 | Abou Shousha | A61B 3/085 |
| 12,239,376 B2* | 3/2025 | Wang | A61B 3/005 |
| 2005/0231688 A1* | 10/2005 | Jones | A61B 3/145 |
| | | | 351/221 |
| 2019/0094552 A1* | 3/2019 | Shousha | A61B 3/024 |
| 2019/0142529 A1* | 5/2019 | Crunick | A61B 34/25 |
| | | | 607/2 |

FOREIGN PATENT DOCUMENTS

| | | |
|---|---|---|
| CN | 101147670 A | 3/2008 |
| CN | 108852280 A | 11/2018 |
| CN | 109288493 A | 2/2019 |
| CN | 109431450 A | 3/2019 |
| CN | 110251073 A | 9/2019 |
| CN | 110575132 A | 12/2019 |
| CN | 112989939 A | 6/2021 |

* cited by examiner

*Primary Examiner* — Mohammed A Hasan
(74) *Attorney, Agent, or Firm* — KPIP Law, PLLC; Kimberly A W Peaslee

(57) ABSTRACT

A system for strabismus assessment and a method of strabismus assessment. The system comprises a display module arranged to display a visual stimulus to be observed by an observer; an image capturing module arranged to record a plurality of images of at least one eye of the observer observing the visual stimulus; and a processing module arranged to determine an ocular misalignment condition of the observer based on the plurality of images recorded by the image capturing module.

12 Claims, 11 Drawing Sheets

SYSTEM FOR STRABISMUS ASSESSMENT AND A METHOD OF STRABISMUS ASSESSMENT

TECHNICAL FIELD

The invention relates to a system for strabismus assessment and a method of strabismus assessment, and particularly, although not exclusively, to an AI-assisted strabismus assessment system.

Strabismus is one of the common clinical eye diseases that affects 2%-5% of the population. The condition has an indication where the eyes do not coordinate properly under binocular viewing. Ocular misalignment is a common complaint of patients with strabismus and may also confuse other persons when eye contact is made with the patient due to the deviating position of the patient's eye.

Strabismus is not just a cosmetic blemish but also triggers a broad range of visual deficits such as diplopia, amblyopia, disruption of stereopsis, and so on, leading to the impairment of motor skills, especially in performing visuomotor tasks such as grasping or postural stability. Apart from these, it may have a range of mental or psychological negative effects on patients.

SUMMARY OF THE INVENTION

In accordance with a first aspect of the present invention, there is provided a system for strabismus assessment comprising: a display module arranged to display a visual stimulus to be observed by an observer; an image capturing module arranged to record a plurality of images of at least one eye of the observer observing the visual stimulus; and a processing module arranged to determine an ocular misalignment condition of the observer based on the plurality of images recorded by the image capturing module.

In accordance with the first aspect, the processing module includes an AI-based processing engine.

In accordance with the first aspect, the AI-based processing engine includes a deep learning-based strabismus deviation module arranged to determine a strabismus deviation of the observer's eye.

In accordance with the first aspect, the processing module further comprises a pupil detection and enhancement module, wherein the pupil detection and enhancement module arranged to perform an image enhancement process including one or more of iris region extraction, pupil region refining, edge detection and filtering, and ellipse fitting, so as to improve a determination of a position of pupil for strabismus assessment.

In accordance with the first aspect, the system further comprises an automated occluder arranged to selectively cover one or both eyes of the observer during an assessment process, such that the visual stimulus is not visually observable by the covered eye.

In accordance with the first aspect, the automated occluder includes a near-infrared (NIR) filter.

In accordance with the first aspect, the image capturing module comprises an infrared illumination source arranged to illuminate the observer eyes, and the image capturing module is arranged to capture images of both eyes of the observer being covered by the occlude or not being covered by the automated occluder.

In accordance with the first aspect, the system further comprises a housing arranged to house the display module, the image capturing module, the automated occluder, a chin rest and a forehead rest to form an integrated assembly, wherein the chin rest and the forehead rest are arranged to restrain a movement of the observer's head during the assessment process.

In accordance with the first aspect, the display module includes a rotatable screen movable between a first deployed position and a second deployed position.

In accordance with the first aspect, the system further comprises a mirror arranged to facilitate an optical reflection the visual stimulus to be observed by the observer so as to increase an optical distance between the visual stimulus and the observer's eye.

In accordance with a second aspect of the present invention, there is provided a method of strabismus assessment comprising the steps of: displaying a visual stimulus to be observed by an observer; recording a plurality of images of at least one eye of the observer observing the visual stimulus; and determining an ocular misalignment condition of the observer based on the plurality of images recorded by the image capturing module.

In accordance with the second aspect, the ocular misalignment condition of the observer is determined by an AI-based processing engine.

In accordance with the second aspect, the AI-based processing engine includes a deep learning-based strabismus deviation module arranged to determine a strabismus deviation of the observer's eye.

In accordance with the second aspect, the step of determining an ocular misalignment condition further comprising the step of performing an image enhancement process including one or more of iris region extraction, pupil region refining, edge detection and filtering, and ellipse fitting, so as to improve a determination of a position of pupil for strabismus assessment.

In accordance with the second aspect, the method further comprises the step of selectively covering one or both eyes of the observer during an assessment process, such that the visual stimulus is not visually observable by the covered eye.

In accordance with the second aspect, one or both eyes of the observer are covered by an automated occluder including a near-infrared (NIR) filter.

In accordance with the second aspect, the method further comprises the step of illuminate the observer eyes with an infrared illumination source, such that images of both eyes of the observer being covered by the occlude or not being covered by the automated occluder are captured.

In accordance with the second aspect, the method further comprises the step of increasing an optical distance between the visual stimulus and the observer's eye by deploying a mirror at a predetermined distance from the display module displaying the visual stimulus such that an optical reflection the visual stimulus is observed by the observer.

In accordance with the second aspect, the method further comprises the step of performing a manual test to confirm of the ocular misalignment condition determined by the processing module based on egocentric images or video recorded by a head mountable camera worn by an examiner performing the manual test.

BRIEF DESCRIPTION OF THE DRAWINGS

Embodiments of the present invention will now be described, by way of example, with reference to the accompanying drawings in which.

DETAILED DESCRIPTION OF THE PREFERRED EMBODIMENTS

The inventors devised that precise measurement of the type and magnitude of ocular deviation is essential for providing appropriate clinical management such as diagnosing strabismus, visual training planning, and prism prescribing.

For example, corneal light reflex test and prism cover test (PCT) are two tests that may be used for clinical measurements, in which the former measures the type and deviation angle based on the position of light reflection to the pupil centre, while the latter requires the optometrist to alternately cover the eye, observe the eye movement, and then estimate the extent of the deviation. The corneal light reflex method is easy to perform for young children and infants who are less cooperative, but not precise enough. However, there are still some limitations regarding the PCT, such as the subjectivity of practitioners in observing and estimating the eye movement, the training and experience level of the examiners, and the cooperation of the patients, resulting in different results when examined by different specialists.

Alternatively, computer-aided diagnosis (CAD) systems may be used for the diagnosis of strabismus. Example CAD system may employ image or video processing methods, machine learning methods, deep learning methods, or eye-tracking methods. The inventors devised that improving the accuracy, efficiency, and operating may be necessary for these technique to be implemented into some exemplary applications.

Figure 1:
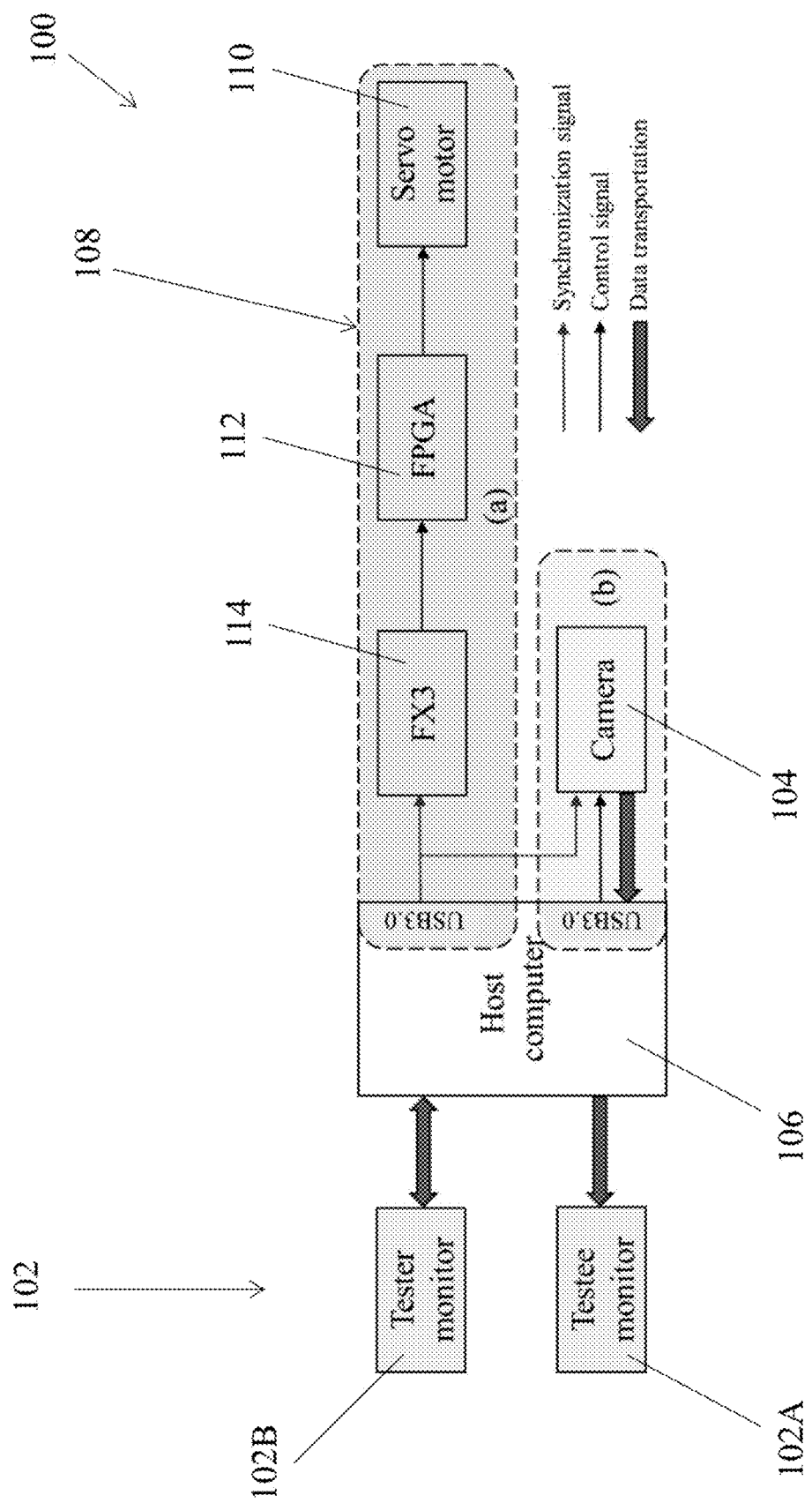
FIG. 1 is a system for strabismus assessment in accordance with an embodiment of the present invention.

With reference to FIG. 1, there is shown an example embodiment of a system 100 for strabismus assessment comprising: a display module 102 arranged to display a visual stimulus to be observed by an observer; an image capturing module 104 arranged to record a plurality of images of at least one eye of the observer observing the visual stimulus; and a processing module 106 arranged to determine an ocular misalignment condition of the observer based on the plurality of images recorded by the image capturing module 104.

For example, the system 100 may be used for strabismus assessment based on analyzing images or video of one or both eyes of the observer (or a patient) viewing a visual stimulus, such as a capital letter "E" displayed on a computer monitor. The visual stimulus may be displayed at different positions on the computer monitor such that the observer's eye. By analyzing the eye gazing directions based on the images of the one or both eyes of the observer, with respect to the corresponding positions of the visual stimulus, a practitioner may determine ocular misalignment condition of the patient, without being required to perform a manual cover test.

In this example, the display module 102 includes a "testee monitor" 102A which may be used to display the visual stimulus at different positions on the screen, and optionally the system may also include a "tester monitor" 102B allowing a practitioner to simultaneously observe the real time image of the patient, especially the eyes, observing the visual stimulus being displayed on the screen of the testee monitor 102A, as well as a mirroring image of the screen of the testee monitor 102A.

In addition, a camera 104 is included to operate as the image capturing module for recording images or video of the eyes of the patient observing the visual stimulus. For example, the camera 104 may be a camera having a resolution of 1280 (H)×1024 (V) and operate at a frame rate of 210 fps, such that the images showing the pupil of each of the eyes of the patient will be clearly captured during the test. The camera 104 may be a full-color imager or an imager which only works within a certain color range such as infrared, depending on the design of the tests being conducted.

In addition, the system 100 further comprises a host computer 106 which may be used as a controller module for controlling all components of the system 100, including the monitors 102, the camera 104, as well as an automated occluder 108 arranged to selectively cover one or both eyes of the observer during an assessment process. The host computer 106 may also operate as a processing module arranged to determine an ocular misalignment condition of the observer based on the plurality of images recorded by the image capturing module.

Alternatively, the host computer or the controller module may be implemented using electronic circuitries including but not limited to application specific integrated circuits (ASIC), field programmable gate arrays (FPGA), microcontrollers, and other programmable logic devices configured or programmed according to the teachings of the present disclosure. Computer instructions or software codes running in the computing devices, computer processors, or programmable logic devices can readily be prepared by practitioners skilled in the software or electronic art based on the teachings of the present disclosure.

By providing the system 100 for strabismus assessment, a method for measuring ocular deviation has been devised for both the patient and the examiner, and has also been tested to be repeatable under the same conditions. The inventors called the system 100 a video-based intelligent ocular misalignment assessment (VIOMA) system. It preferably includes three sub-modules, namely the automatic cover module, the motion-capture module, and the diagnostic module.

With reference to FIG. 1, the automatic cover module 108 comprises a servo motor. 110 slide connected to a control unit to automate the traditional cover test, where the operator sends commands through the host computer interface via USB3.0 port to a FPGA 112, and the FPGA 112 receives the command and controls the servo motor 110 to execute the corresponding action. FX3 114 is the controller chip of the USB3.0, which communicates with the FPGA 112 via slave FIFO mode. Thus, the automatic cover module 108 may be used as the automated occluder controlled by the host computer 106, to automatically cover one of the eyes of the patient so that the patient may only observe the visual stimulus only a single eye in an automatic cover test.

The motion capture module or the image capturing module 104 may automatically record the patient's eye movements while performing the automatic cover test, where the image acquisition software may be launched automatically by sending a specific command (synchronous signal) through the host computer 106 interface by the tester. After a short response time, the camera 104 may be automatically switched on and may start image acquisition. When the automatic cover test process is terminated, the image acquisition process may stop automatically, with the video saved to a specified path, then the saved images or the video stream may be analysed by the processing module.

The host computer 106 may be used to run another process, perform data storage and algorithm calculation. The tester monitor 102B displays the graphic user interface, performs the test, and presents the test process and results. The testee 102A monitor is used to display visual targets only.

Preferably, the processing module 106 may include an AI-based processing engine, such as a deep learning-based strabismus deviation module arranged to determine a strabismus deviation of the observer's eye. The deep learning-based strabismus deviation module may be trained with a training set with a plurality of samples, such that the ocular misalignment condition of the patient may be determined with the input images showing different pupil's positions under different stimulus conditions.

In an example manual cover test (CT), patients may be asked to fixate on an accommodative visual target, and the examiner covers the patients' eyes with an opaque occluder. And prism bars with powers of 1, 2, 4 to 20 PD in 2 PD steps and powers of 25 to 45 PD in 5 PD steps are used to quantify the magnitude of strabismus. The automatic cover module imitates the manual cover test without the need for prism neutralization.

Figure 2:
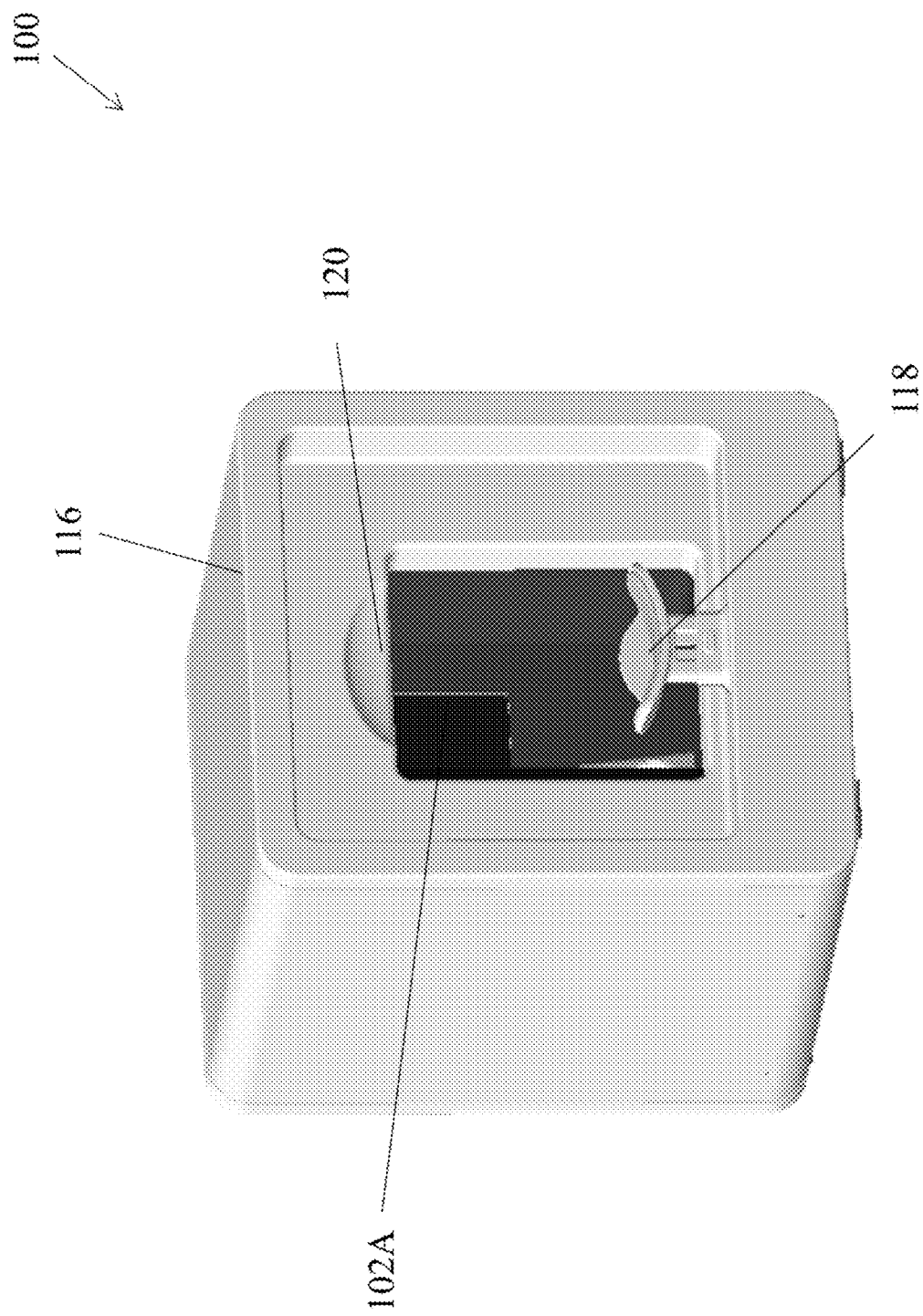
FIG. 2 is a perspective view showing a system for strabismus assessment in accordance with an embodiment of the present invention.

With reference to FIG. 2, the testee monitor 102A, the camera 104 and the automated occluder 108 may be integrated in a unitary assembly housed in a housing 116. In this example, the system 100 also includes a chin rest 118 and a forehead rest 120 to form an integrated assembly, wherein the chin rest 118 and the forehead rest 120 are arranged to restrain a movement of the observer's head during the assessment process. When the patient places his/her head at the predetermined position supported by the chin rest 118 and the forehead rest 120, the patient is able to view the screen 102A at a predetermined distance such as 33 cm away from the observer's eyes, and the eyes of the patient may be simultaneously captured by the camera 104, both being deployed opposite to the chin rest 118 on the housing 116.

In an example strabismus assessment, the assessment process may consist of three components. 1) Accommodative stimulus: clinically, a standard near CT requires fixation on a single letter of a size one line larger than the subject's best near VA of the poorer eye. The visual stimulus, a white Snellen "E" letter, may be displayed at the centre of the testee monitor with a black background, and placed at about 33 cm from the patient in the primary position. The primary position refers to the position assumed by the eye when one is looking straight ahead with body and head erect. The size of the letter can be adjusted by the testee using the left and right keys of the keyboard according to detailed written instructions on the screen to facilitate fine fixation and proper stimulation of accommodation. In this example, the subjects' head is restrained by a chin rest and a forehead rest.

Preferably, the automated occluder includes a near-infrared (NIR) filter. In this example the second component is 2) Near-infrared (NIR) filter as occluder: Traditional occluders completely cover the eye, and the examiner cannot observe its movement either. If a proper occluder is used, it becomes possible to register the movements of the covered eye, which is likely to improve the accuracy of magnitude measurement. Preferably, a NIR filter comprising a black infrared transmission acrylic sheet, with the size of 65 mm wide, 300 mm high, and 3 mm thick, may be used as an occluder, which has the characteristics of shielding visible light, selective high transmission of rear-infrared, especially for the 800-1100 nm band.

Based on the property of the NIR filter to shield the visible light, it can achieve the purpose of blocking the field of view of the subject, and it was also verified by visual inspection that observers could not have a residual view of the target through the NIR occluder. Advantageously, the used of NIR filter enable the covered eye being "visualized" by using a camera which may captured lights in the NIR band via the NIR occluder, such that the images of the covered eye may also be captured, as well as being observed by a tester if necessary.

The automated occluder 108 may be controlled by a motion control unit, which controls the sequential execution of the unilateral cover test and the alternating cover test, where a servo step motor rotates at a specific speed and direction to drive the left and right movement of the occluder on the slipway under the signals from the control circuit board with an FPGA as the core. It took approximately 0.3 seconds to occlude completely the visual field.

Figure 3:
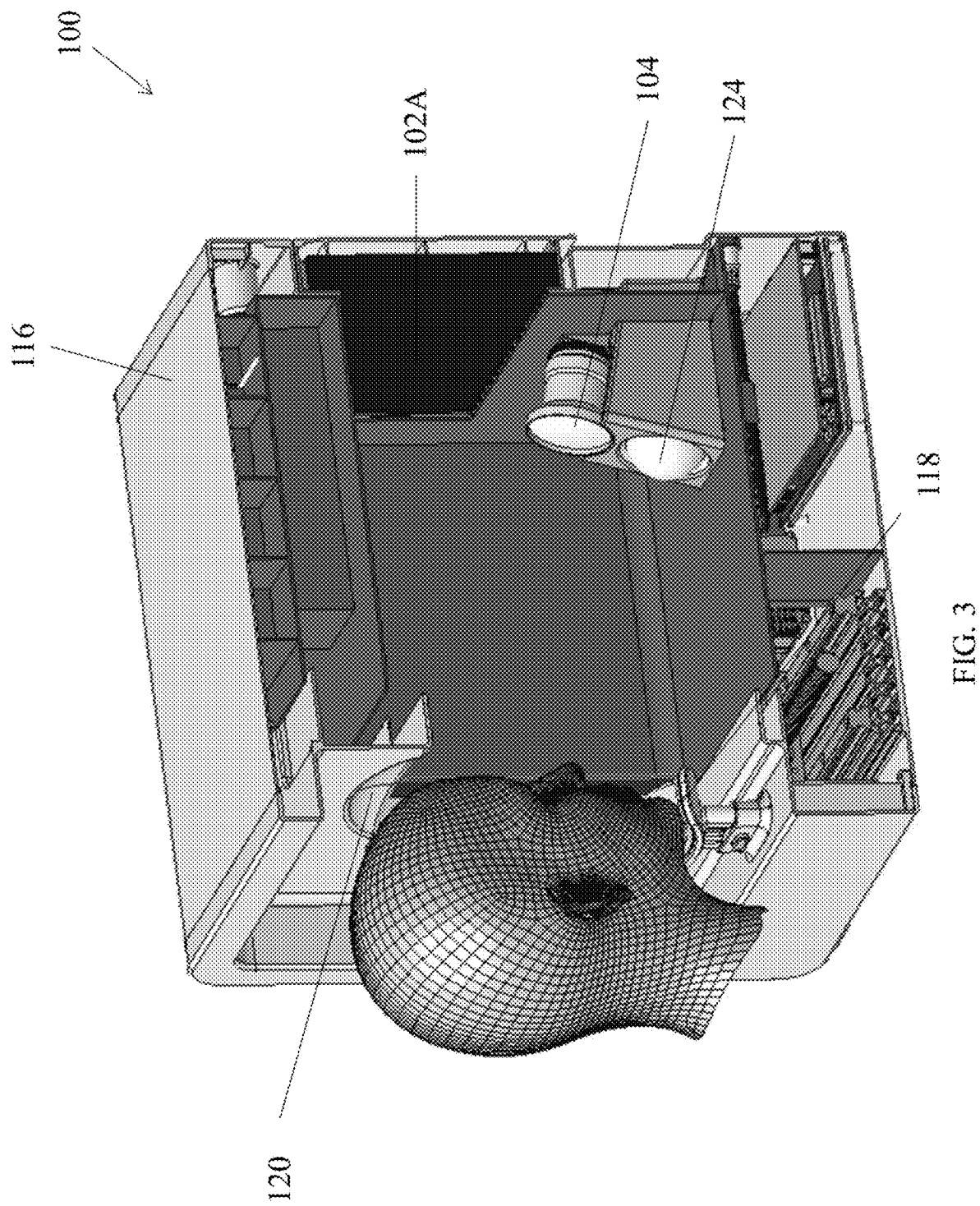
FIG. 3 is a cross-sectional view showing internal components in the housing of the system for strabismus assessment of FIG. 2.
Figure 4:
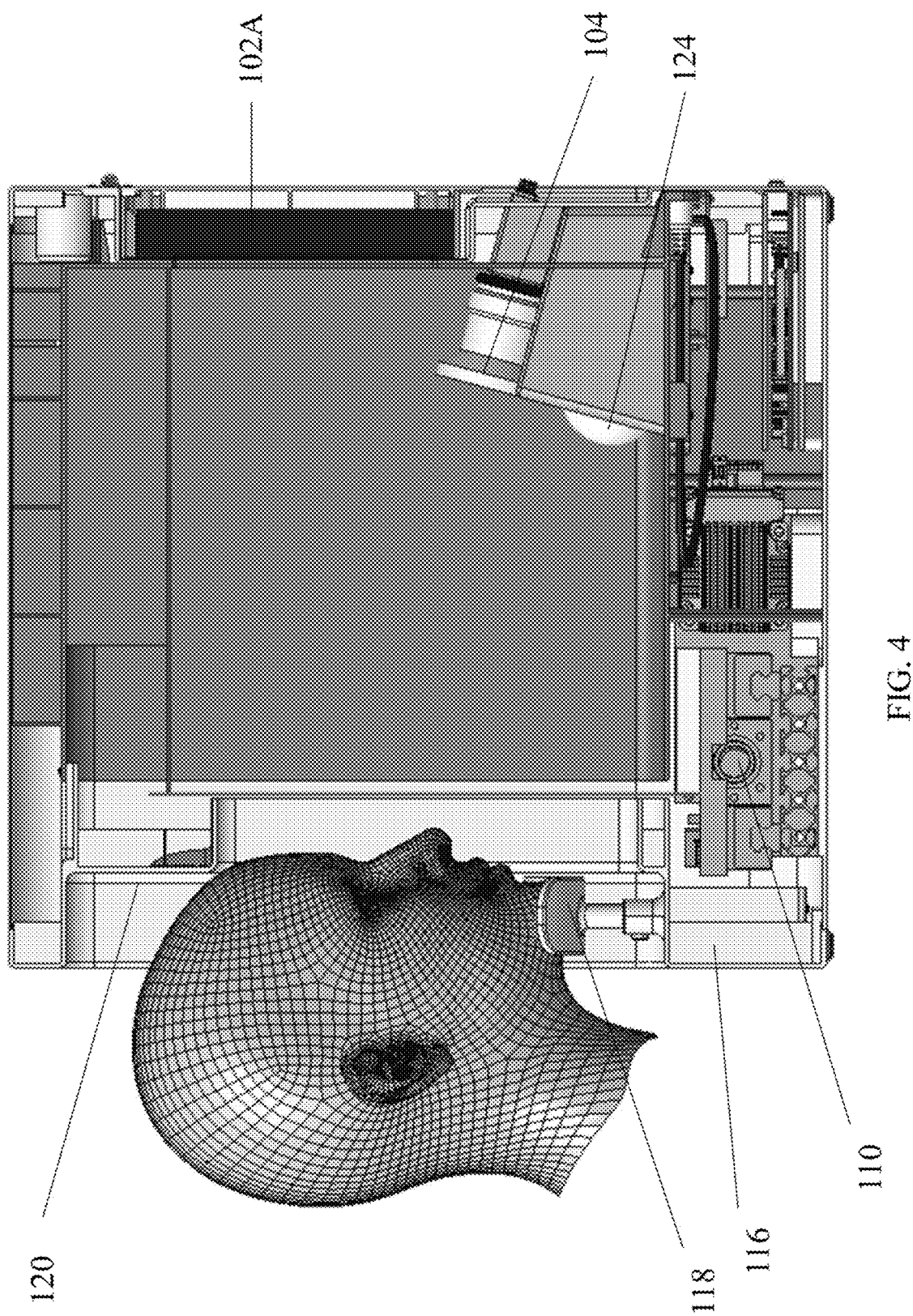
FIG. 4 is a cross-sectional side view showing internal components in the housing of the system for strabismus assessment of FIG. 2.
Figures 5, 6:
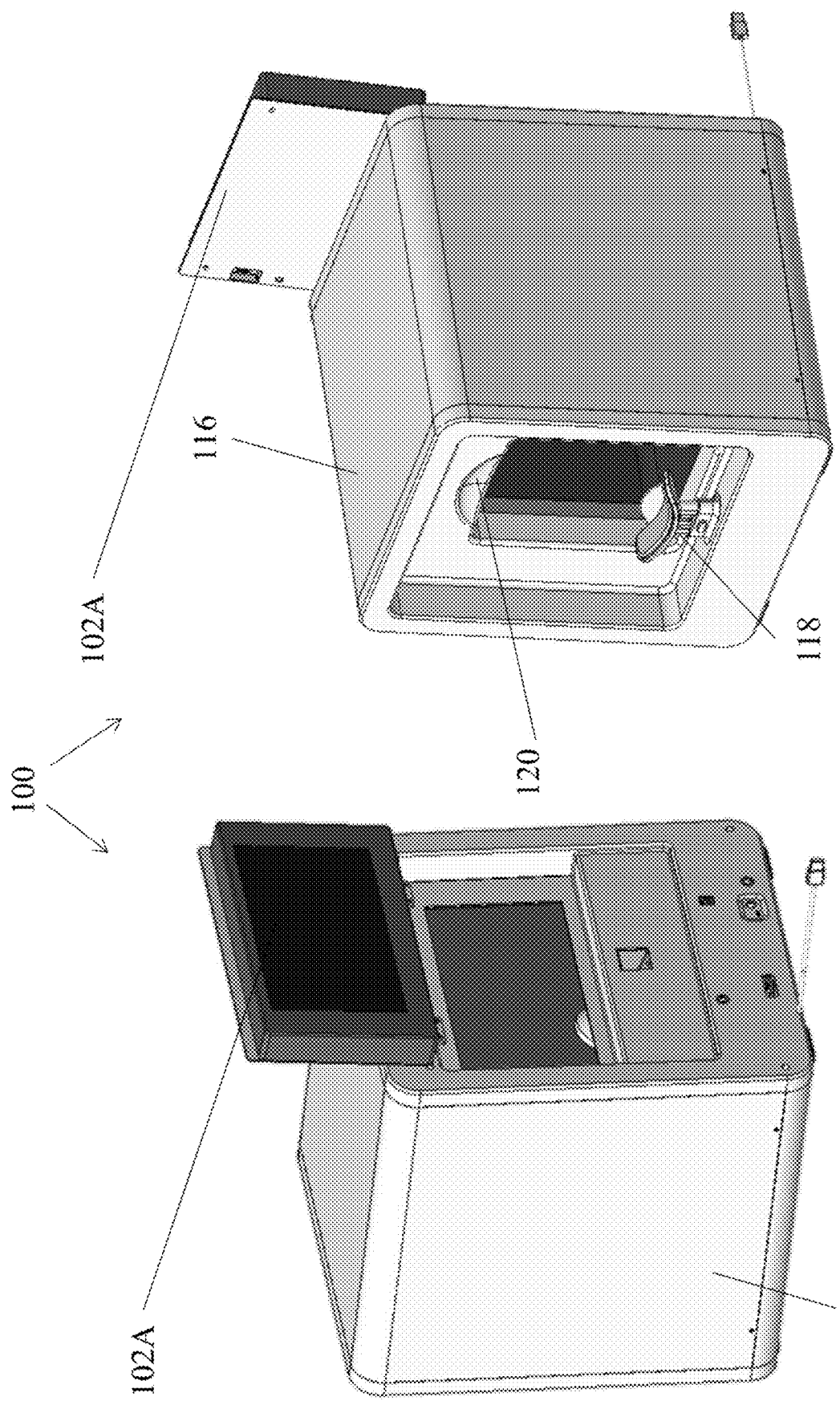
FIG. 5 is a perspective view showing the system for strabismus assessment of FIG. 2 with a rotatable screen being moved to a second deployed position to facilitate a distance cover test.
FIG. 6 is another perspective view of the system for strabismus assessment of FIG. 5.
Figure 7:
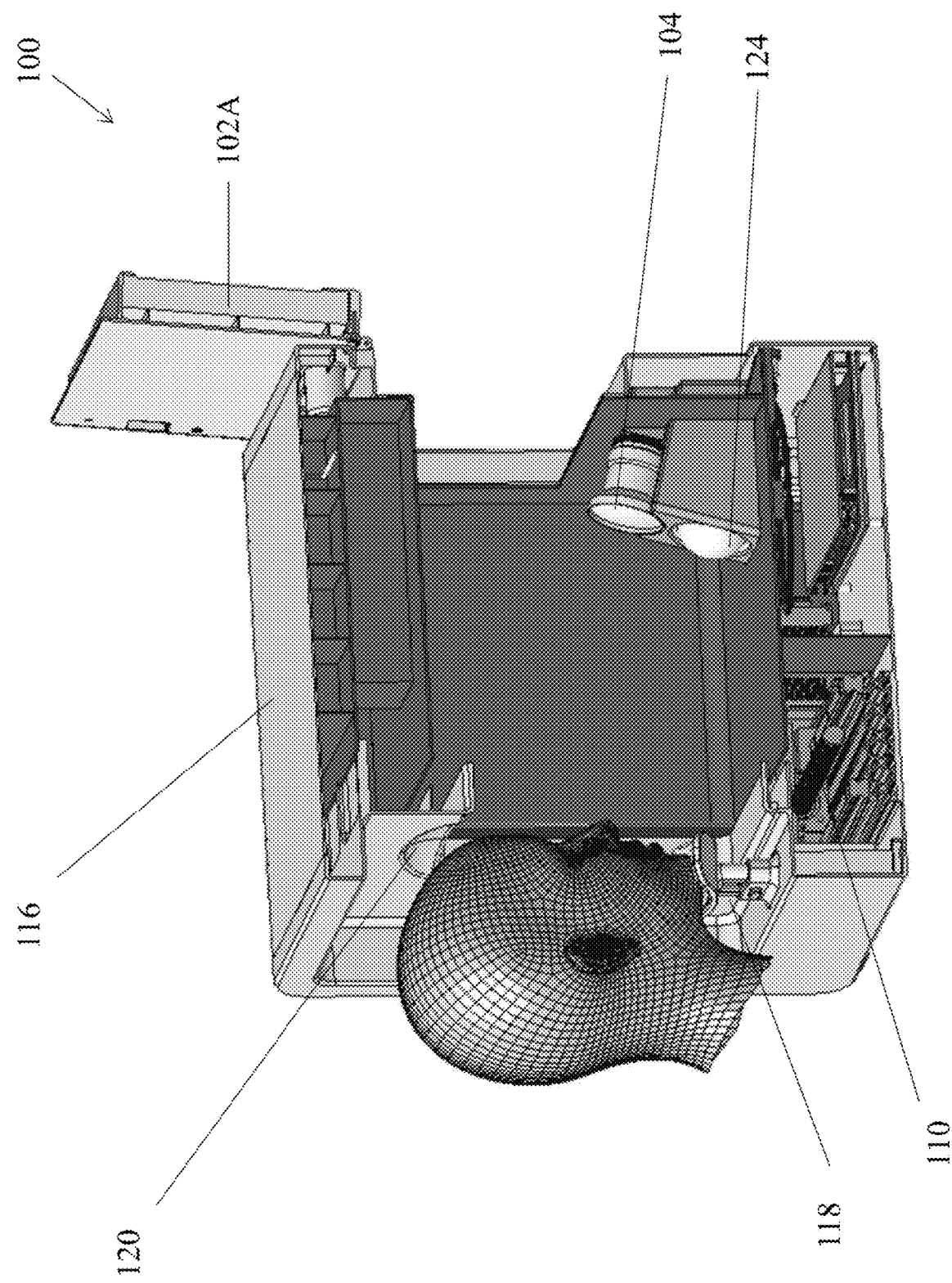
FIG. 7 is a cross-sectional view showing internal components in the housing of the system for strabismus assessment of FIG. 5.
Figure 8:
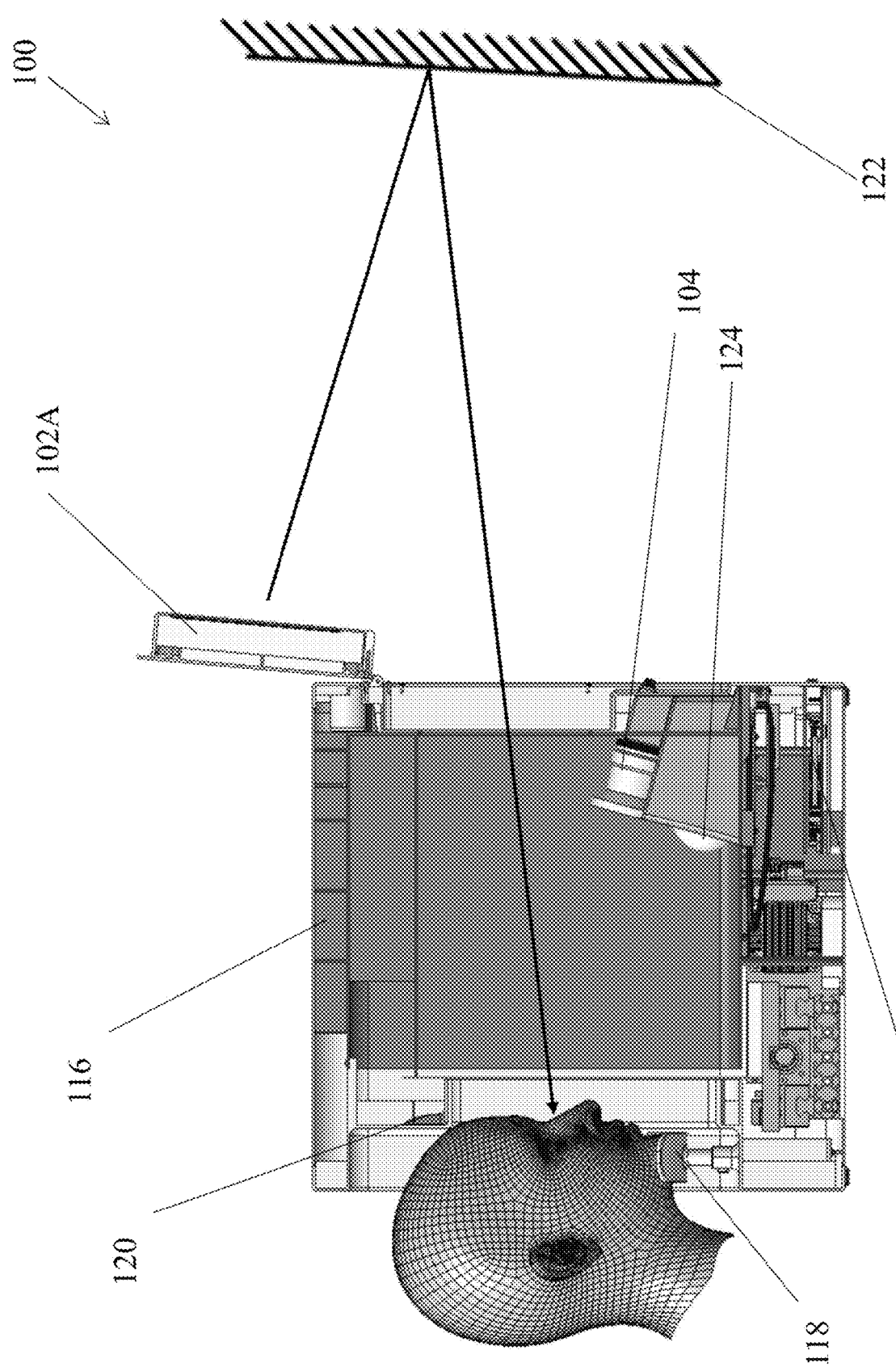
FIG. 8 is an illustration showing an example operation of the system for strabismus assessment of FIG. 5 during a distance cover test.

During the test, binocular eye positions may be recorded with an image capturing module 104 (the third component, also referred as a motion capture module in this disclosure) such as a lightweight digital infrared video camera (MER-131-210U3M NIR, DAHENG IMAGING, China) at a resolution of 1280*1024 at 50 Hz. Optionally, the image capturing module 104 further comprises an infrared illumination source 124 arranged to illuminate the observer eyes. The eyes may be illuminated by infrared LED (wavelength 850 nm), which is invisible to the subject to allow for the recording without distracting the subject. The radiation intensity of LED may measure with an optical power meter (PM400, Thorlabs, USA) so as to keep it far below exposure risk levels. Thus, the image capturing module 104 is arranged to capture images of both eyes of the observer being covered by the occlude or not being covered by the automated occluder. With reference also to FIGS. 3 and 4, the camera 104 is placed directly in front of the patient's face at the lower position, to provide an unobstructed view of the presented targets. The light source is far from the camera's optical axis, so a dark pupil appears in the image.

Preferably, all sub-components except the host computer 106 and tester monitor 102B may be integrated into a protective case 116 for a stable configuration, and different modules may be connected to the host computer 106 via suitable interfaces such as USB links and video ports. The recordings may be done under normal lighting conditions in the examining room. Alternatively, operator without having any knowledge of strabismus may also operate on the system 100, for the reason that only one command needs to be sent to trigger the system, and the results may be generated using the AI-based processing module, with or without being further examined by a practitioner/examiner.

Preferably, the display module 102 includes a rotatable screen movable between a first deployed position and a second deployed position, in which the patient may view the screen 102A directly when the rotatable screen is moved at the first deployed position as shown in FIGS. 3 and 4, or the patient may view the screen 102A being deployed at the second deployed position indirectly via a mirror 122 placed at a distance from the screen. Preferably, the mirror 122 may facilitate an optical reflection the visual stimulus to be observed by the observer so as to increase an optical distance between the visual stimulus and the observer's eye, as shown in FIGS. 5 to 8. Advantageously, the system 100 may facilitate strabismus assessment including a near cover test of 33 cm when the screen 102A is at the first deployed position as well as a distance cover test of 6 m when the screen 102A is at the second deployed position.

Alternatively, the optical distance the distance cover test may be adjusted by varying the relative position of the mirror 122 with respect to the rotatable screen 102A.

Figure 9:
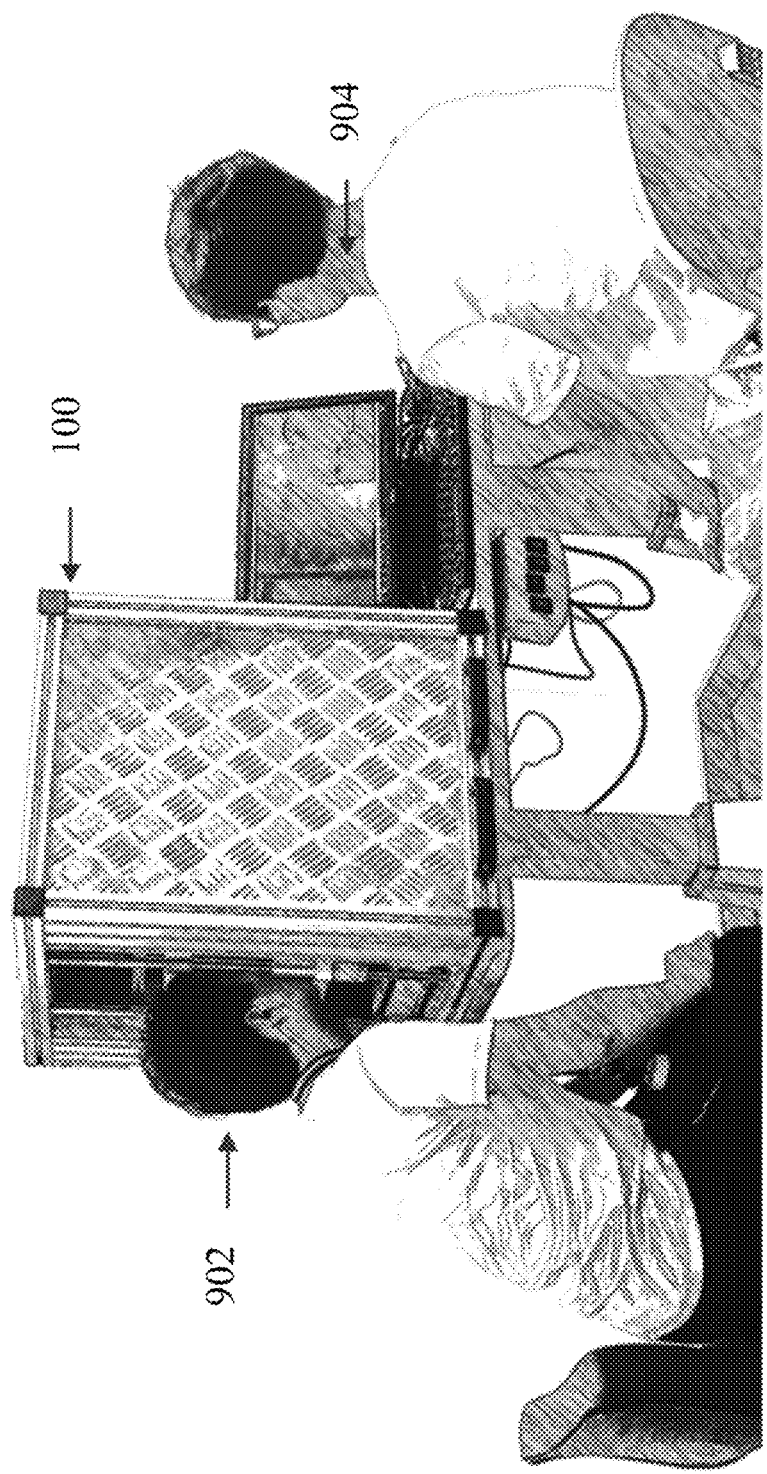
FIG. 9 is an illustration showing an example operation of the system for strabismus assessment of FIG. 2.

Before the examination, the subject/patient 902 should be seated in front of the VIOMA platform 900 with the chin and forehead settled as shown in FIG. 9, fixate at the visual stimuli, and autonomously adjust its size so that the eye is able to see through the precise use of accommodation. The tester 904 sends specific instructions on the upper computer to start the automatic cover test, meanwhile, the motion capture module records the whole test process, with the videos saved to a pre-set directory. The video may be further processed by the AI based processing engine, to produce an assessment of ocular misalignment.

Figure 10:
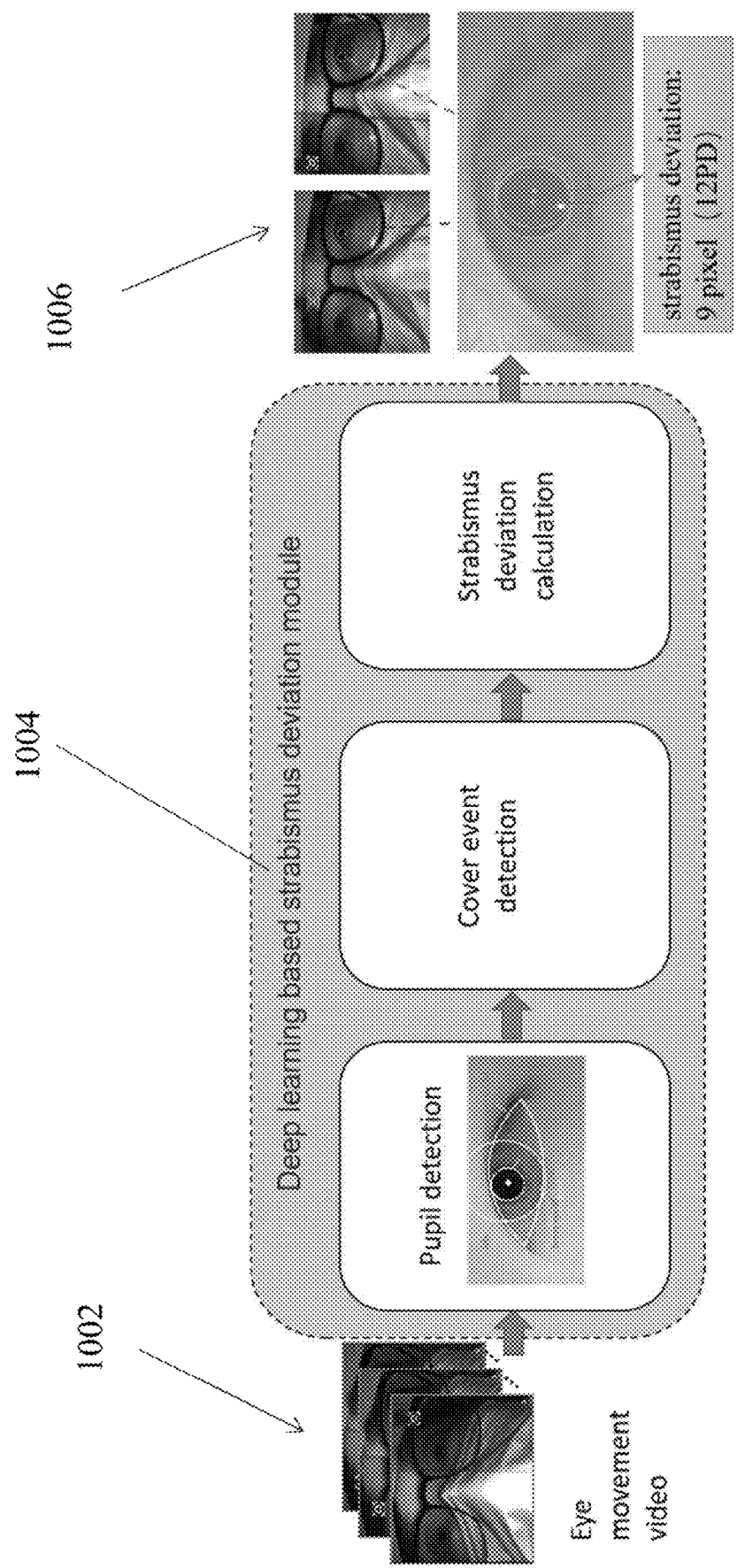
FIG. 10 is a flow diagram showing the operation of the AI based processing engine of the system for strabismus assessment in accordance with an embodiment of the present invention.

With reference to FIG. 10, the strabismus video 1002, as the input to the AI based processing engine 1004, is processed to output the strabismus assessment results 1006, including the presence or absence of strabismus, the type, and the magnitude of strabismus. The AI based processing engine 1004 may automatically estimate the ocular misalignment based on the position change of the pupil centres at the beginning and ending positions, as well as the extracted eye regions, the iris boundaries, measured diameters of the pupils, etc. The inventors devised that a dataset of 10 subjects is sufficient enough to generate the eye templates that can achieve satisfactory eye detection results. For example, ten subjects may be selected from a strabismus dataset and with only the left and right eye templates at a resolution of 400*200 are used for training the AI based processing engine 1004.

Preferably, the video recorded by the system may present only half of the patient's face, where the lower part is covered by a mask due to COVID-19, also for privacy protection. In order to analyse the eye movement, the eye region may be extracted to reduce the searching space. Based on these cropped eye images, dataset-specific average templates may be developed for the left and right eyes. The template matching was applied on the face image, the position where each of the generated eye templates best matches the face image was the estimated position of the template within the image. After detecting the eyes in 10 frames randomly selected in each video, the matching points with the highest concentration are selected by voting, using the average value of them as the final, eye position.

Optionally, the processing module 1004 further comprises a pupil detection and enhancement module, wherein the pupil detection and enhancement module arranged to perform an image enhancement process including one or more of iris region extraction, pupil region refining, edge detection and filtering, and ellipse fitting, which may further improve a determination of a position of pupil for strabismus assessment.

In the stage of iris boundary detection, the iris boundary, particularly, the boundary separating the sclera from the iris, may be located for the measurement of the iris diameter in preparation for angle calculation. For example, a nonlinear grey-level transformation may be used to replace grey level 1 with $I^\gamma$, where $\gamma \in [0, 1]$ is a user-defined parameter (here, $\gamma=0.5$). This step enhances the local dynamic range of the eye images in dark or shadowed regions while compressing it in bright regions. Due to the low contrast of the iris and sclera, and the saliency of the pupil in the eye image, the pupil as a sign of iris position was first roughly detected using VASIR's pupil detection method. The ROI of the iris was segmented with dimensions of maximum iris radius of the dataset from the pupil centre in the eye image. Then circular Hough transform may be employed to locate the iris boundary. The above operations are applied on the right and left eye regions of the aforementioned 10 frames of face images, respectively. The iris value with the largest frequency is determined as the final radius. The same strategy as for eye region detection may be applied to the detected iris centres.

The pupil localization technique may be employed as eye reaction can be characterized by changes in the position of the pupil. The pupil localization may consist of four steps: iris region extraction, pupil region refining, edge detection and filtering, Restricted-RANSAC (R-RANSAC) ellipse fitting.

Firstly, the iris region may be segmented with a dimension of iris radius on both sides, starting from the iris centre in the eye image. The radius value and iris centre used in this step are obtained during the iris boundary detection stage. The initial region estimation may not be accurately centred on the pupil.

Hence, in the next step, the pupil region may be finely approximated within the iris region. Since the pupil is known to be the darkest part against other tissue of the eye image under IR light, it can be segmented from the background if given an appropriate threshold. Instead of the manual threshold setting, K-means clustering is designed on the histogram of the iris region to find three clusters, i.e., pupil, iris, and other background areas. Assuming that the darkest cluster corresponds to the pupil pixels, a segmented binary pupil image may be created by thresholding any pixels above 1.2 times of the cluster centroid value of the darkest cluster. In the binary image, the largest connected domain is considered to be the pupil region. The centre of the outer rectangle of this connected domain approximates the pupil position, and V times the half of the maximum value of the width and height of the outer rectangle is an estimate of the pupil region.

Thirdly, edge detection and filtering may be used to collect the contour points of the pupil. The image may be firstly smoothed with a Gaussian filter, then a morphological open operation is used to eliminate small objects and smooth the boundaries of larger objects, and then the edge image is detected by Canny filtering with the low threshold and high threshold calculated from two cluster centroids. Since the pupil contour tends to be circular or elliptical curves, those short edges and long straight edges are considered as disturbs and are removed. If the curve contains less than 5 pixels, it is considered a short edge and removed. If the number of pixels of a line whose distance from the mean position is less than a threshold exceeds a certain ratio, the line is straight and is therefore deleted as well. In the final stage, an ellipse is fitted to the edge pixels using a modified RANSAC method.

In contrast to the RANSAC that randomly samples at all sample points for model fitting, a restricted random sampling technique, R-RANSAC, may be employed. In the R-RANSAC, the edge pixels may be divided into sectors by firing rays in all directions, centred on the estimated pupil position. A sector may be first randomly selected and then a sample is randomly selected in that sector until five sampling points are selected for ellipse fitting. Finally, the model with the largest consensus set is the contour of the pupil, and the centre of the model is the centre of the pupil. The frame number and the centre of the pupil are returned for the subsequent data analysis.

Figure 11:
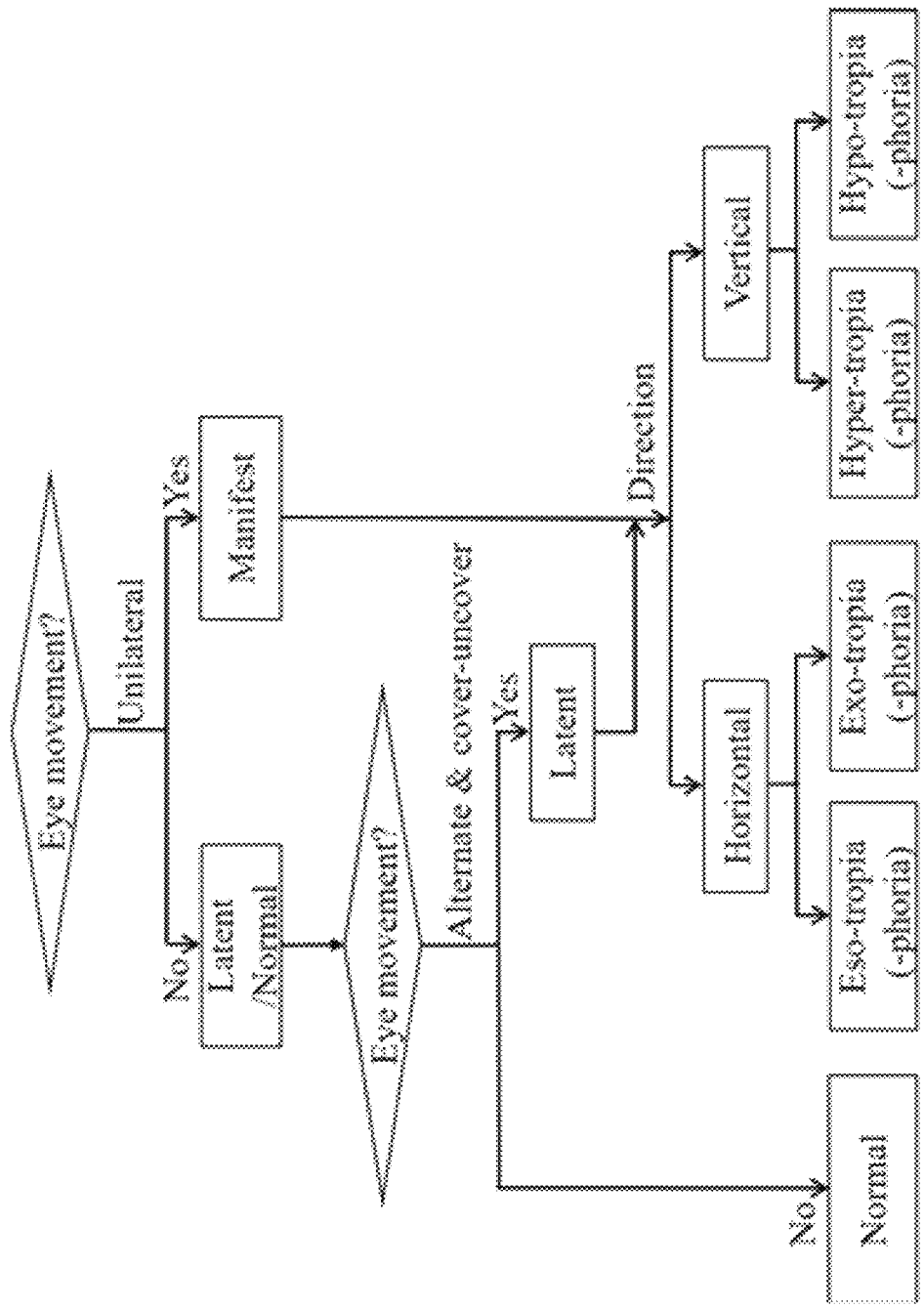
FIG. 11 is a flow chart showing the operation of the AI based processing engine of FIG. 10 and example assessment results provided by the AI based processing engine.

With reference to FIG. 11, different directions of eye deviation under cover tests lead to different types of strabismus. According to the direction of deviation, it can be further divided into-horizontal eso-tropia (phoria), exo-tropia (phoria), vertical hyper-tropia (phoria), or hypo-tropia (phoria). The unilateral cover test and alternating cover test are performed in order of priority.

Figure 12:
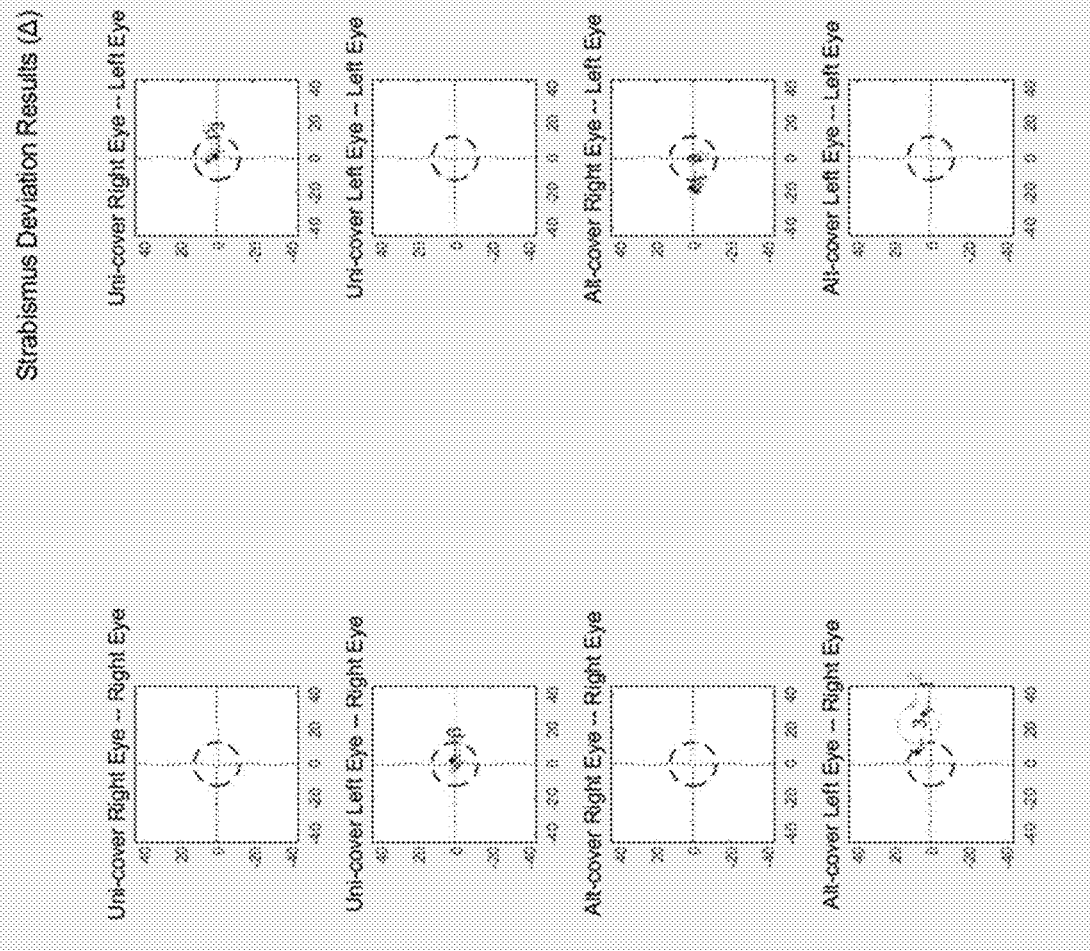
FIG. 12 is an example strabismus deviation report generated by the system for strabismus assessment, including the directions and magnitudes of eye movement in cover test (prism dioptre).

With reference also to FIG. 12, the AI based processing engine may determine that the patient is normal or is suffering from ocular misalignment condition, such as eso-tropia, eso-phoria, exo-tropia, exo-phoria, hyper-tropia, hyper-phoria, hypo-tropia or hypo-phoria. For example, in the unilateral cover test stage, if a large deviation is detected (above 10 PD), the patient has heterotropia, and if the patient's eyes are aligned with each other, the patient may be orthophoric or heterophoria. The alternating cover test is used to differentiate the type of strabismus and to measure the degree of strabismus more accurately. If both eyes of the patient are still aligned with each other on the alternating cover test stage, the patient is determined to be normal.

These embodiments may be advantageous in that, a video-based intelligent ocular misalignment assessment (VIOMA) system is provided for automatic diagnosis of strabismus, which enables the automatic execution and evaluation of cover tests, determining the presence, type, and magnitude of eye deviation.

Advantageously, an automated hardware system and an intelligent method are provided for the assessment of ocular misalignment, where the automatic cover tests may be implemented based on a protocol of control circuit under the simultaneous surveillance of the camera and evaluated by step-by-step video analysis.

In addition, an automatic cover tests video dataset for strabismus (StrabismusACT-76) may be established, which consists of videos of automatic cover tests and corresponding clinical diagnoses of strabismus, as well as video labelling results. Of these samples, six (6.6%) had heterotropia, sixty-six (86.8%) had heterophoria, and 6 (6.6%) were orthophoric.

Moreover, the experimental results show that the intelligent system provides precise detection and measurement of ocular misalignment and has the advantages of being objective, repeatable, and easy to perform for both the patient and examiner.

Although not required, the embodiments described with reference to the Figures can be implemented as an application programming interface (API) or as a series of libraries for use by a developer or can be included within another software application, such as a terminal or personal computer operating system or a portable computing device operating system. Generally, as program modules include routines, programs, objects, components and data files assisting in the performance of particular functions, the skilled person will understand that the functionality of the software application may be distributed across a number of routines, objects or components to achieve the same functionality desired herein.

It will also be appreciated that where the methods and systems of the present invention are either wholly implemented by computing system or partly implemented by computing systems then any appropriate computing system architecture may be utilised. This will include tablet computers, wearable devices, smart phones, Internet of Things (IoT) devices, edge computing devices, stand alone computers, network computers, cloud-based computing devices and dedicated hardware devices. Where the terms "computing system" and "computing device" are used, these terms are intended to cover any appropriate arrangement of computer hardware capable of implementing the function described.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. A system for strabismus assessment comprising:
a display module arranged to display a visual stimulus to be observed by an observer;
an image capturing module arranged to record a plurality of images of at least one eye of the observer observing the visual stimulus; and
a processing module arranged to determine an ocular misalignment condition of the observer based on the plurality of images recorded by the image capturing module;
wherein the processing module includes an AI-based processing engine;
wherein the AI-based processing engine includes a deep learning-based strabismus deviation module arranged to determine a strabismus deviation of the observer's eye; and
wherein the processing module further comprises a pupil detection and enhancement module, wherein the pupil detection and enhancement module arranged to perform an image enhancement process including one or more of iris region extraction, pupil region refining, edge detection and filtering, and ellipse fitting, so as to improve a determination of a position of pupil for strabismus assessment.

2. The system of claim 1, further comprising an automated occluder arranged to selectively cover one or both eyes of the observer during an assessment process, such that the visual stimulus is not visually observable by the covered eye.

3. The system of claim 2, wherein the automated occluder includes a near-infrared (NIR) filter.

4. The system of claim 3, wherein the image capturing module comprises an infrared illumination source arranged to illuminate the observer eyes, and the image capturing module is arranged to capture images of both eyes of the observer being covered by the occlude or not being covered by the automated occluder.

5. The system of claim 2, further comprising a housing arranged to house the display module, the image capturing module, the automated occluder, a chin rest and a forehead rest to form an integrated assembly, wherein the chin rest and the forehead rest are arranged to restrain a movement of the observer's head during the assessment process.

6. The system of claim 5, wherein the display module includes a rotatable screen movable between a first deployed position and a second deployed position.

7. The system of claim 6, further comprising a mirror arranged to facilitate an optical reflection the visual stimulus to be observed by the observer so as to increase an optical distance between the visual stimulus and the observer's eye.

8. A method of strabismus assessment comprising the steps of:
displaying a visual stimulus to be observed by an observer;
recording a plurality of images of at least one eye of the observer observing the visual stimulus; and
determining an ocular misalignment condition of the observer based on the plurality of images recorded by the image capturing module;
wherein the ocular misalignment condition of the observer is determined by an AI-based processing engine;
wherein the AI-based processing engine includes a deep learning-based strabismus deviation module arranged to determine a strabismus deviation of the observer's eye; and
wherein the step of determining an ocular misalignment condition further comprising the step of performing an image enhancement process including one or more of iris region extraction, pupil region refining, edge detection and filtering, and ellipse fitting, so as to improve a determination of a position of pupil for strabismus assessment.

9. The method of claim 8, further comprising the step of selectively covering one or both eyes of the observer during an assessment process, such that the visual stimulus is not visually observable by the covered eye.

10. The method of claim 9, wherein one or both eyes of the observer are covered by an automated occluder including a near-infrared (NIR) filter.

11. The method of claim 10, further comprising the step of illuminate the observer eyes with an infrared illumination source, such that images of both eyes of the observer being covered by the occlude or not being covered by the automated occluder are captured.

12. The method of claim 8, further comprising the step of increasing an optical distance between the visual stimulus and the observer's eye by deploying a mirror at a predetermined distance from the display module displaying the visual stimulus such that an optical reflection the visual stimulus is observed by the observer.

* * * * *